United States Patent
Johji

(10) Patent No.: US 10,459,415 B2
(45) Date of Patent: Oct. 29, 2019

(54) CONTROL PROGRAM AUTOMATIC CREATION SYSTEM

(71) Applicant: MITSUBISHI ELECTRIC CORPORATION, Chiyoda-ku, Tokyo (JP)

(72) Inventor: Yoshifumi Johji, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 57 days.

(21) Appl. No.: 15/758,649

(22) PCT Filed: Sep. 14, 2015

(86) PCT No.: PCT/JP2015/075961
§ 371 (c)(1),
(2) Date: Mar. 8, 2018

(87) PCT Pub. No.: WO2017/046834
PCT Pub. Date: Mar. 23, 2017

(65) Prior Publication Data
US 2018/0246487 A1    Aug. 30, 2018

(51) Int. Cl.
*G05B 15/00*    (2006.01)
*G05B 19/042*    (2006.01)

(52) U.S. Cl.
CPC .................. *G05B 19/0426* (2013.01); *G05B 2219/23333* (2013.01); *Y02P 90/12* (2015.11); *Y02P 90/14* (2015.11); *Y02P 90/18* (2015.11)

(58) Field of Classification Search
CPC .... G05B 19/0426; G05B 19/05; G05B 19/42; Y02P 90/12

(Continued)

(56) References Cited

U.S. PATENT DOCUMENTS

| 6,996,366 B2 * | 2/2006 | L'Allier | .................. G09B 7/02 434/118 |
| 2005/0288802 A1 * | 12/2005 | Yamada | ................. G05B 19/05 700/83 |

FOREIGN PATENT DOCUMENTS

| JP | 62-247409 A | 10/1987 |
| JP | 02-171901 A | 7/1990 |

(Continued)

OTHER PUBLICATIONS

International Search Report (PCT/ISA/210) dated Oct. 13, 2015, by the Japanese Patent Office as the International Searching Authority for International Application No. PCT/JP2016/075961.

(Continued)

*Primary Examiner* — Mohammad Ali
*Assistant Examiner* — Sheela Rao
(74) *Attorney, Agent, or Firm* — Buchanan Ingersoll & Rooney PC

(57) ABSTRACT

A control program automatic creation system includes a control program creator which creates a control program of the plant instrument based on the block diagram; a controller which receives a process signal from the plant instrument; and a network which connects the control program creator and the controller. The control program creator transmits the control program by way of the network. When the controller receives the control program by way of the network, the controller stores it in the memory, and further executes the control program, and transmits a computational decision of the control program by way of the network. When the control program creator receives the computational decision of the control program by way of the network from the controller, the creator superimposes the computational decision on the block diagram which the display displays and displays the superimposed decision.

9 Claims, 16 Drawing Sheets

(58) Field of Classification Search
USPC .......................................................... 700/83
See application file for complete search history.

(56) References Cited

FOREIGN PATENT DOCUMENTS

| | | |
|---|---|---|
| JP | 05-150806 A | 6/1993 |
| JP | 08-286714 A | 11/1996 |
| JP | 2001-092504 A | 4/2001 |
| JP | 2009-187175 A | 8/2009 |
| JP | 2011-13887 A | 1/2011 |
| JP | 2013-235381 A | 11/2013 |
| JP | 2014-106888 A | 6/2014 |

OTHER PUBLICATIONS

Written Opinion (PCT/ISA/237) dated Oct. 13, 2015, by the Japanese Patent Office as the International Searching Authority for International Application No. PCT/JP2016/075961.

* cited by examiner

CONTROL PROGRAM AUTOMATIC CREATION SYSTEM

FIELD OF THE INVENTION

The present invention relates to a control program automatic creation system, and more particularly, relates to a control program automatic creation system which creates a control program automatically from a block diagram for showing the arrangement of plant instruments.

BACKGROUND OF THE INVENTION

As for the supervision and control system in a power generation plant, the development of devices which are capable of generating executable codes (control program) for the plant controlling from a block diagram, a design document of higher rank, is in progress (for example, refer to Patent Documents 1-5). Here, in the first place, a block diagram is created as a design document of higher rank, using a commercial CAD (Computer Aided Design) tool and others. On the other hand, in order to create a control program from the block diagram, a man interprets at first the block diagrams which are created with the CAD tool. After that, manual efforts will be made to input the logics for control and computing which are designed to operate as intended, using an engineering tool. The engineering tool is connected to input devices, such as a monitor, a keyboard, a mouse, and a touch operation device. In these days, a device which converts from a block diagram that has been created with the CAD tool into the logics for control and computing that can be edited with an engineering tool is also proposed.

CITATION LIST

Patent Literature

Patent Document 1: JP 2001-92504 A
Patent Document 2: JP 2013-235381 A
Patent Document 3: JP 5-150806 A
Patent Document 4: JP 2-171901 A
Patent Document 5: JP 8-286714 A

SUMMARY OF THE INVENTION

Technical Problem

Since the block diagram of a design document has very much amount of information in it, the input operation of the logics for control and computing by the engineering tool takes an immense amount of time. Inputting errors are easy to be produced in this work, and then, improvement in working efficiency is called for. On line monitoring, which checks the running state of the logics for control and computing on the monitor of a block diagram, cannot be performed, because the working logics for control and computing are different from the block diagram, even when converting from the block diagram, which has been created with the CAD tool, into the logics for control and computing which can be edited with an engineering tool. The block diagram, which is a design document of higher rank, is hard to find the corresponding section on a monitor. Accordingly, delay has arisen in taking action, when some failures are occurred in a plant.

In the engineering tool for creating the logics for control and computing, embodiments of the present invention have been implemented in order to solve the above mentioned subjects, and aim at offering a control program automatic creation system which is capable of creating a block diagram, a design document of higher rank, in a convincing way. Further, the embodiments of the present invention also aim at obtaining a control program automatic creation system which can compile directly a block diagram and is capable of creating a control program from the block diagram.

Solution to Problem

According to the embodiments of the present invention, a control program automatic creation system comprises: a control program creating unit, having a block diagram data storage section, an executable code storage section, and a display section; wherein the control program creating unit stores a block diagram which shows an arrangement of a plant instrument in the block diagram data storage section, creates a control program of the plant instrument based on the block diagram which is stored in the block diagram data storage section, and further stores the created control program in the executable code storage section, a controlling unit, having a PIO device and a memory, the controlling unit receiving a process signal from the plant instrument which is to be connected with the PIO device, and a network, connecting the control program creating unit and the controlling unit, wherein the control program creating unit transmits the control program which is stored in the executable code storage section by way of the network, and when the controlling unit receives the control program by way of the network, the controlling unit stores the control program in the memory, and further executes the control program, and transmits a computational decision of the control program by way of the network, and when the control program creating unit receives the computational decision of the control program by way of the network from the controlling unit, the control program creating unit superimposes the computational decision on the block diagram which the display section displays and displays the superimposed decision.

Advantageous Effects of Invention

The control program automatic creation system according to the embodiments of the present application is capable of creating a block diagram which is a design document of higher rank, and makes it possible to generate a control program (executable codes) from the block diagram. In addition to that the entry task of the monitoring operation screen can be improved in efficiency, on-line monitoring can be attained on the block diagram. Further, when an abnormal situation occurs in a plant, the corresponding area of the block diagram, which is a design document of higher rank, becomes easy to know immediately, and the maintainability of the plant will be improved.

DESCRIPTION OF EMBODIMENTS

Figure 1:
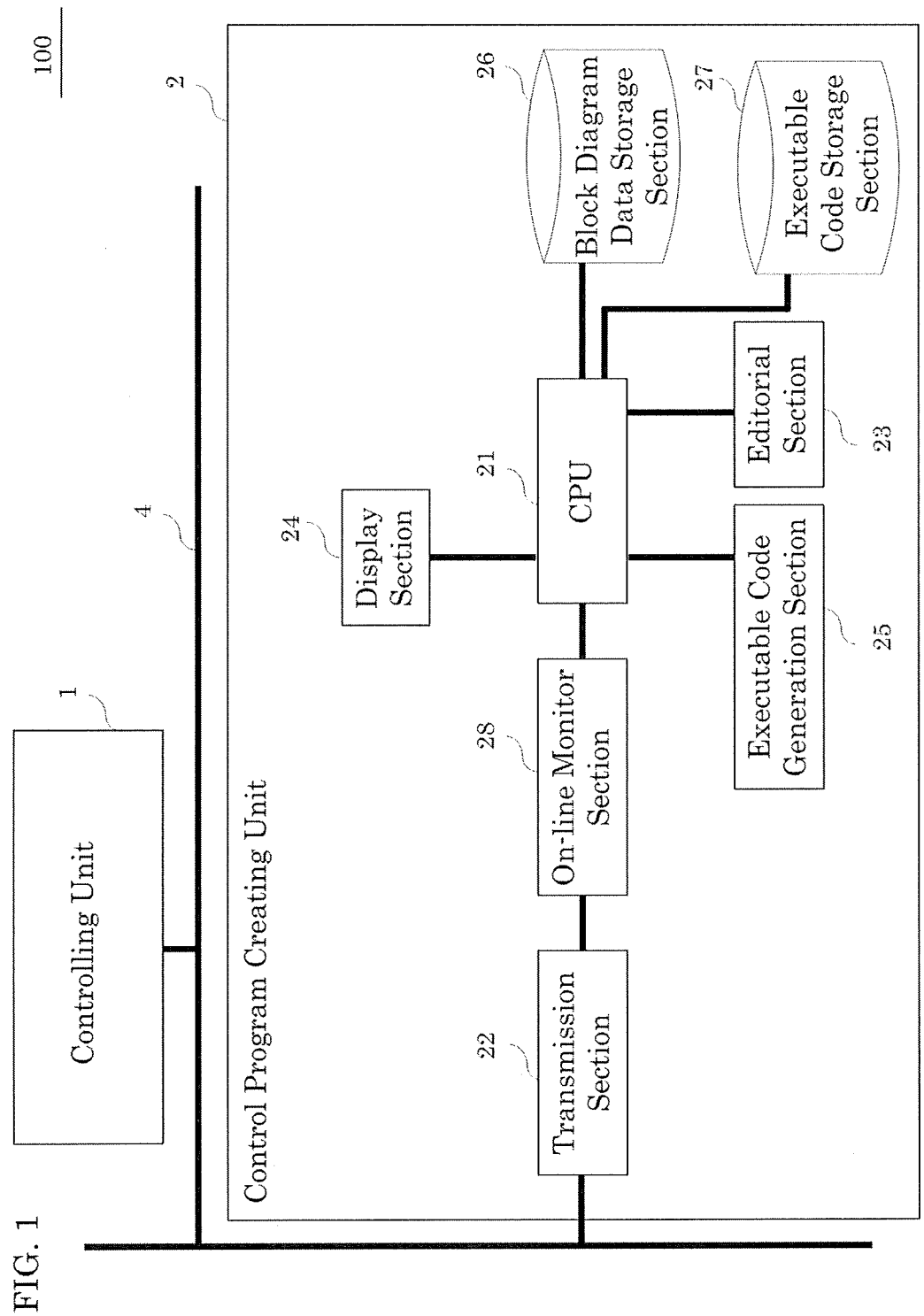
FIG. 1 is a drawing for showing the whole configuration of a control program automatic creation system in accordance with Embodiment 1.

Hereinafter, a control program automatic creation system according to the embodiments of the present invention will be described with reference to drawings. Incidentally, the same reference numerals are given to those identical or similar to constitutional portions in respective drawings and the size and/or the scale size of the corresponding respective constitutional portions are respectively independent. For example, when the identical constitutional portions, which are not changed, are shown, the size and/or the scale size of the identical constitutional portions may different among sectional views in which a part of the configuration is changed. Furthermore, although the configurations of the control program automatic creation system are further actually provided with a plurality of members, for ease of explanation, only portions necessary for explanation will be described and other portions are omitted.

Embodiment 1.

Hereinafter, the explanation of a control program automatic creation system in accordance with Embodiments of the present invention, which is used in a power generation plant, will be given with reference to drawings. A plurality of apparatuses and devices, which are referred to as plant instruments, are attached to the power generation plant. FIG. 1 shows the configuration of a control program automatic creation system 100 in accordance with Embodiment 1 of the present invention. The control program automatic creation system 100 in accordance with Embodiment 1 comprises a controlling unit 1, a control program creating unit 2, and a maintenance network (network) 4. The controlling unit 1 is connected to plant instruments, and controls the operational status, the amount of processes and the like of the power generation plant. The control program creating unit 2 creates automatically executable codes (control program) which work at the controlling unit 1. The maintenance network 4 is a communication network, by which the controlling unit 1 and the control program creating unit 2 are connected each other.

The control program creating unit 2 is provided with a CPU (Central Processing Unit) 21, a transmission section 22, an editorial section 23, a display section 24, an executable code generation section 25, a block diagram data storage section 26, an executable code storage section 27, and an on-line monitor section 28. The CPU 21 takes command of the transmission section 22, the editorial section 23, the display section 24, the executable code generation section 25, the block diagram data storage section 26, the executable code storage section 27, and the on-line monitor section 28. The transmission section 22 receives computational decisions of a control program, like alarm information and others, which are transmitted from the controlling unit 1 by way of the maintenance network 4. The editorial section 23 includes input devices, such as a keyboard and a mouse, and creates a block diagram for showing the arrangement of plant instruments, by inputting pictorial figures. The block diagram data storage section 26 stores the block diagram data for showing block diagrams which were created in the editorial section 23.

The executable code generation section 25 creates, from the block diagram data which are stored in the block diagram data storage section 26, executable codes (control program) which work in the controlling unit 1. The executable code storage section 27 stores the executable codes (control program) which are created in the executable code generation section 25. Computational decisions, which are received from the controlling unit 1 by way of the transmission section 22, will be superimposed on the block diagram data which are stored in the block diagram data storage section 26, and the on-line monitor section 28 displays the superimposed results on the display section 24, like a monitor and others. As a result, the control program creating unit 2 superimposes the computational decision, such as alarm information, on the block diagram which the display section 24 displays, and displays the superimposed computational decision. It is to be noted that, although the example shown in the drawing illustrates a single set of the controlling unit 1 and the control program creating unit 2, which are respectively connected to the maintenance network 4, the configuration where multiple sets of the controlling unit 1 and the control program creating unit 2 are connected to the maintenance network 4 is allowable.

Figure 2:
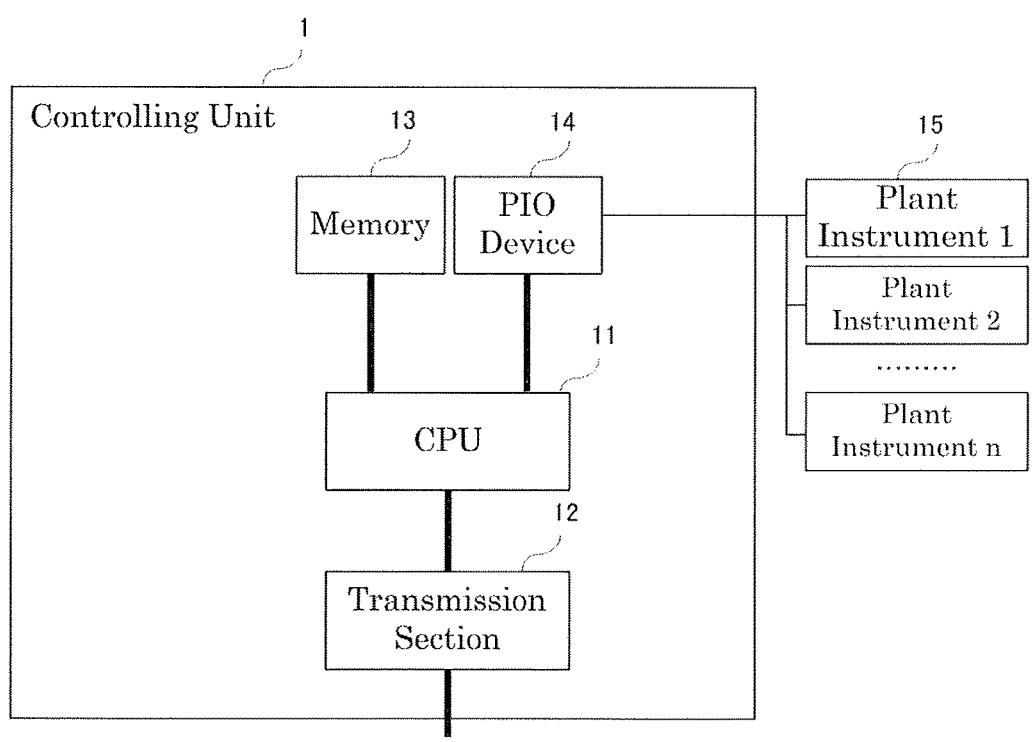
FIG. 2 is a drawing for showing the configuration of a controlling unit in accordance with Embodiment 1.

FIG. 2 shows the configuration of a controlling unit 1. The controlling unit 1 is provided with a CPU (Central Processing Unit) 11, a transmission section 12, a memory 13, and a process signal input-output device 14. The CPU 11 takes command of a transmission section 12, a memory 13, and a process signal input-output device 14. In the drawing, the process signal input-output device 14 is described as PIO (Process Input Output) device. The PIO device is connected to a plurality of plant instruments 15 by an exclusive cable. The process signal input-output device 14 receives process signals, like temperature, speed, pressure and others, and situation signals like operational status and others, from two or more sets of the plant instruments 15. The controlling unit 1 executes a control program, and controls the operational status and amount of processes of the plant instrument 15 based on the data (process signal, situation signal, and others) received from the plant instrument 15. A control program (executable codes) which is updated automatically is stored in the memory 13. In other words, the control program creating unit 2 delivers the control program stored in the executable code storage section by way of a network, and when the controlling unit 1 receives the control program by way of the network, the controlling unit 1 stores the program in the memory 13. Data (computational decisions) of the computational decisions and others in the CPU 11, are transmitted to the control program creating unit 2 by way of the transmission section 12 and the maintenance network 4. A pump, a fan, a valve, and the like are contained in the plant instruments 15.

Next, explanations will be given on the operation of the control program automatic creation system 100. In the controlling unit 1, process signals like temperature, speed, pressure and others, and situation signals like operational status and others, are input from the plant instrument 15 by way of the process signal input-output device 14. The CPU 11 receives a command signal and the like, which are input by way of the transmission section 12 and the maintenance network 4. In addition, the CPU 11 executes the control program (executable codes) which is stored in the memory 13, and performs arithmetic processing which is included in the control program. Computational decisions of the executable codes are output from the CPU 11 to the process signal input-output device 14. The process signal input-output device 14 controls the plant instrument 15 according to the computational decisions of the executable codes.

At the control program creating unit 2, a block diagram, a design document of higher rank, is created and edited, by inputting pictorial figures, in the editorial section 23 which has input devices, like a keyboard, a mouse and others. The completed block diagram, which shows the arrangement of plant instruments, is stored in the block diagram data storage section 26. The executable code generation section 25 extracts control operation logics from the block diagram data which are stored in the block diagram data storage section 26, and compiles them to generate the executable codes of a control program. The compiled executable codes are stored in the executable code storage section 27. Furthermore, the executable codes (control program), which are stored in the executable code storage section 27, are transmitted to or delivered to the controlling unit 1 by way of the transmission section 22 and the maintenance network 4, and will be stored in the memory 13 of the controlling unit 1.

Furthermore, in the control program creating unit 2, the computational decisions of the control program are received from the controlling unit 1 by way of the maintenance network 4 and the transmission section 22, and operational status, alarm information, and the like on the plant instrument are displayed on the display section 24, such as a monitor. The on-line monitor section 28 receives the computational decisions of the control program from the controlling unit 1, and further displays the received computational decisions on the area corresponding to the control operation logics of the block diagram which is stored in the block diagram data storage section 26, together with a block diagram which is displayed by the display section 24. Parameter setup of the executable codes which are operating in the controlling unit 1 is performed with input devices such as a keyboard, a mouse and the like, which are owned by the editorial section 23.

Figure 3:
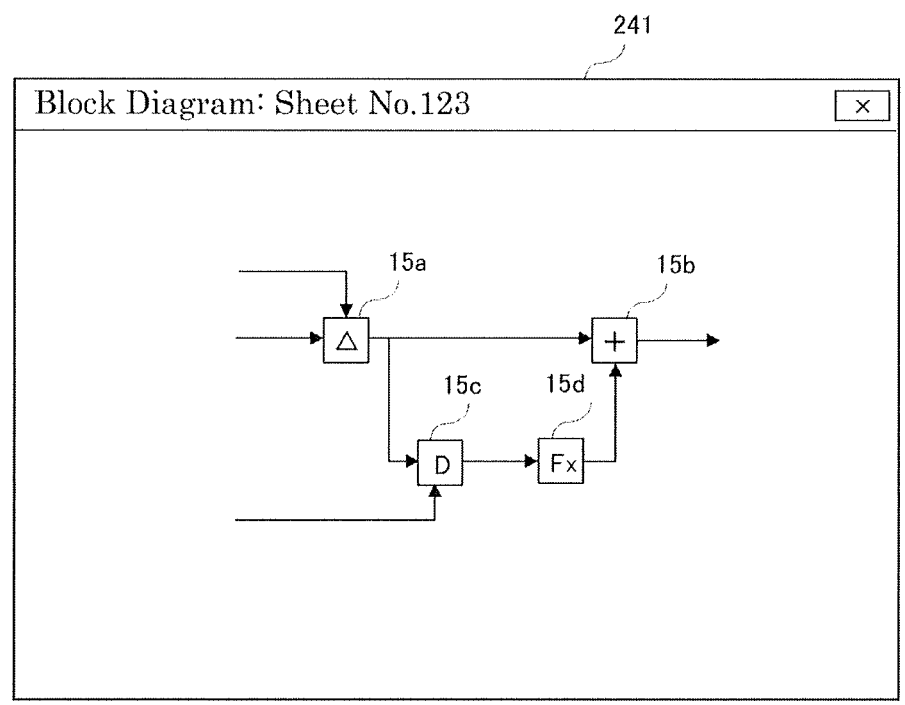
FIG. 3 is a drawing for showing a block diagram in accordance with Embodiment 1.

FIG. 3 shows an example of the block diagram which is displayed on the display section 24 of the control program creating unit 2. The arrangement of the plant instruments 15a-15d is displayed on the screen 241. In this screen 241, a block diagram can be created and edited by using input devices, such as a keyboard and a mouse. The on-line monitor section 28 of the control program creating unit 2 superimposes the computational decisions of the controlling unit 1 on the block diagram which is displayed on the screen 241 of the display section 24, and displays the block diagram together with the computational decisions. For example, the on-line monitor section 28 displays alarm information on the corresponding area of the block diagram, when an abnormal situation occurs in any one of the plant instruments 15.

Figure 4:
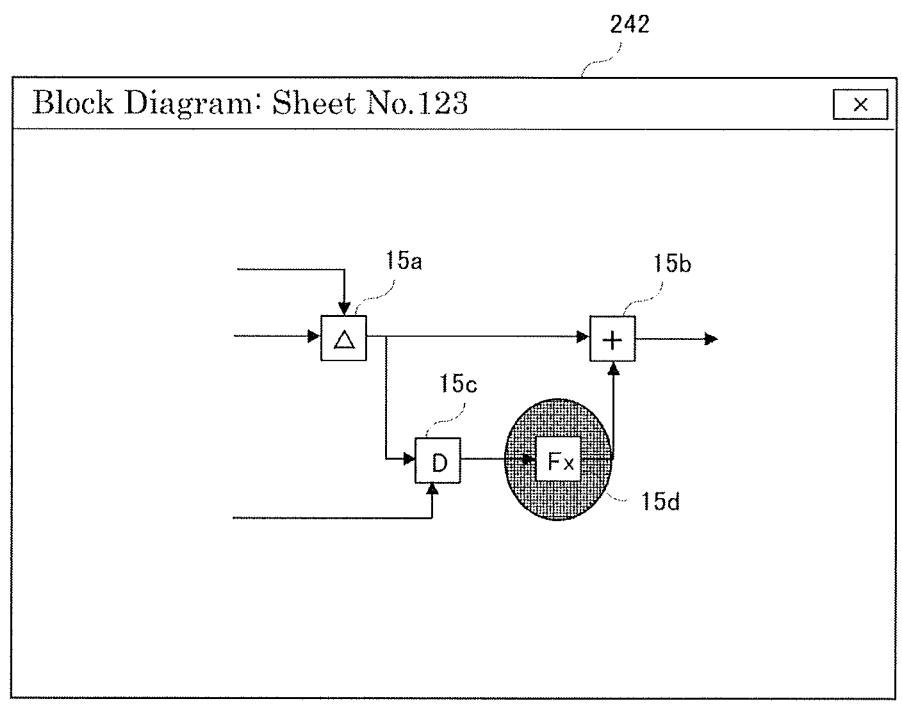
FIG. 4 is a block diagram for showing that a plant instrument is issuing a warning.

FIG. 4 illustrates a screen 242 which is displayed on the display section 24, when an abnormal situation occurs to the plant instrument 15. The screen 242 shows that the plant instrument 15d is raising an alarm and an abnormal situation has occurred to the plant instrument 15d. Therefore, in the control program automatic creation system in accordance with Embodiment 1, the controlling unit will raise alarm information to the network, if an abnormal situation is discovered on the plant instrument which is connected to the PIO device, and, if the control program creating unit receives an alarm information by way of the network, the control program creating unit will display a block diagram which is displayed by the display section, together with the received alarm information.

As mentioned above, the control program automatic creation system 100 in accordance with the present embodiment can create a block diagram which is a design document of higher rank, and further, makes it possible to generate executable codes (control program) from the block diagram. The efficiency of entry tasks can be increased, and on-line monitoring is attained on the block diagram. Alarm information and the like are superimposed on the block diagram to be displayed, from the computational decisions of the control program, when an abnormal situation occurs to the plant instrument. Accordingly, the corresponding area of the block diagram, which is a design document of higher rank, becomes easy to know immediately, and the maintainability of the plant instrument will be improved.

As mentioned above, in the control program automatic creation system 100 according to the present embodiment, the controlling unit, which controls the operational status and the amount of processes of plant instrument, and the control program creating unit, which generates the executable codes which operate in the controlling unit, are connected by the communication network each other. A feature is in that the control program creating unit comprises an editorial section which creates a block diagram by inputting pictorial figures with an input device, an executable code generation section which generates executable codes from the block diagram, and an on-line monitor section which superimposes the computational decisions or operation state received from the controlling unit on the block diagram and displays the superimposed both data.

Embodiment 2.

Figure 5:
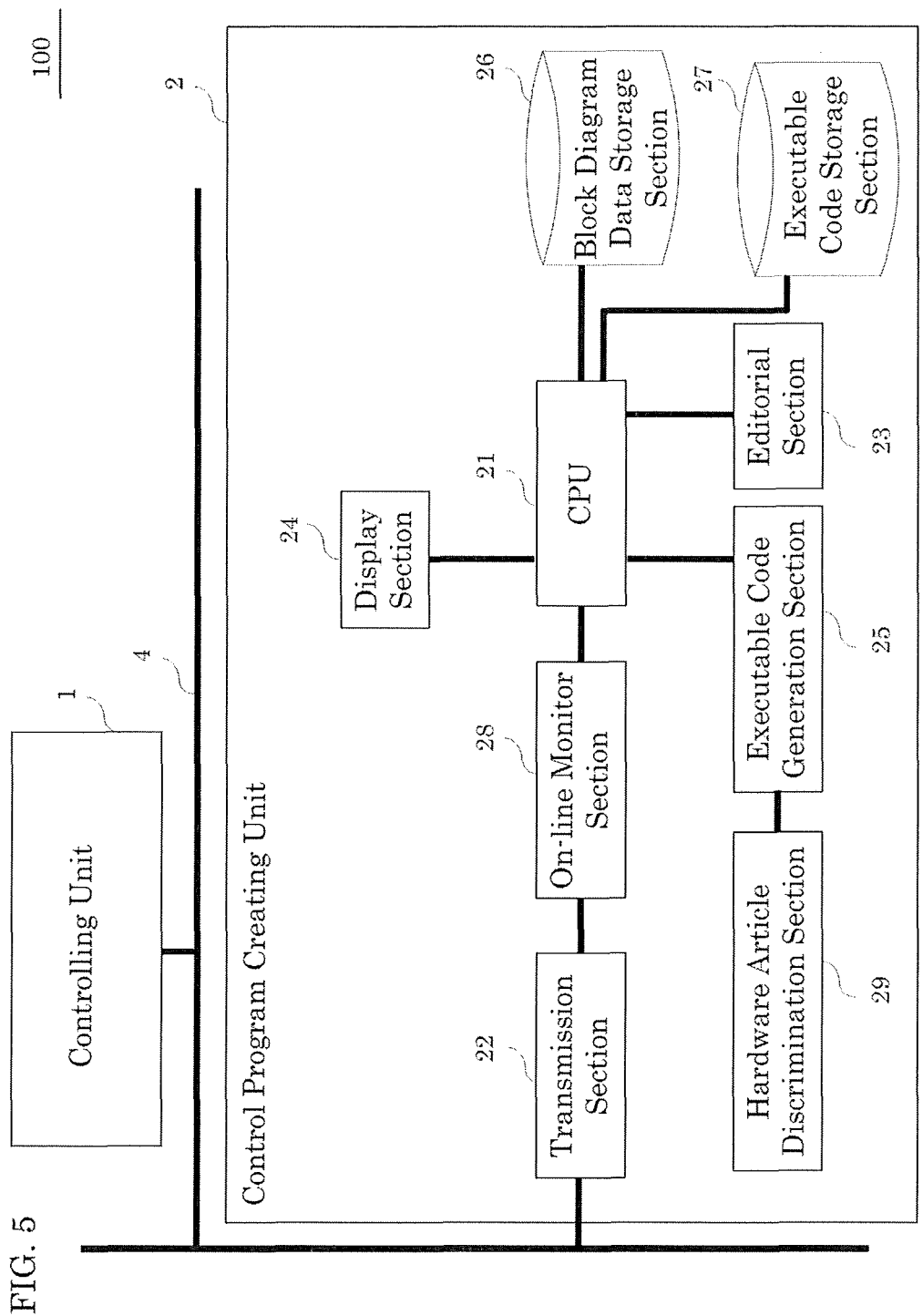
FIG. 5 is a drawing for showing the whole configuration of a control program automatic creation system in accordance with Embodiment 2.

FIG. 5 shows the whole configuration of a control program automatic creation system in accordance with Embodiment 2 of the present invention. The control program automatic creation system 100 comprises a controlling unit 1, a control program creating unit 2, and a maintenance network 4. The configuration of the controlling unit 1 in accordance with the present embodiment is the same as that of the above-mentioned Embodiment 1 (refer to FIG. 2). According to the present embodiment, the control program creating unit 2 is provided with a hardware article discrimination section 29, which is connected to the executable code generation section 25. As for the rest components of the control program creating unit 2, the configuration is the same as that of the above-mentioned Embodiment 1. Hardware (Hard Ware) articles are connected with the input (AI; Analog Input, DI; Digital Input) and output (AO; Analog Output, DO: Digital Output) of the control operation logics, which are operated in the controlling unit 1.

In the control program creating unit 2, it is possible to create the block diagram containing a hardware article by the editorial section 23, which includes input devices, like a keyboard, a mouse and others. The hardware article is not a control operation logic which is operated from the controlling unit 1. Accordingly, the hardware article is unnecessary information at the time of generating executable codes, even though it is described in the block diagram. The hardware article discrimination section 29 identifies a hardware article from the block diagram data which are stored in the block diagram data storage section 26, and passes the block diagram data in which the hardware article are excluded to the executable code generation section 25. The executable code generation section 25 extracts control operation logics from the block diagram data, and compiles them to generate executable codes. The CPU 21 stores the compiled executable codes (control program) in the executable code storage section 27.

Figure 6:
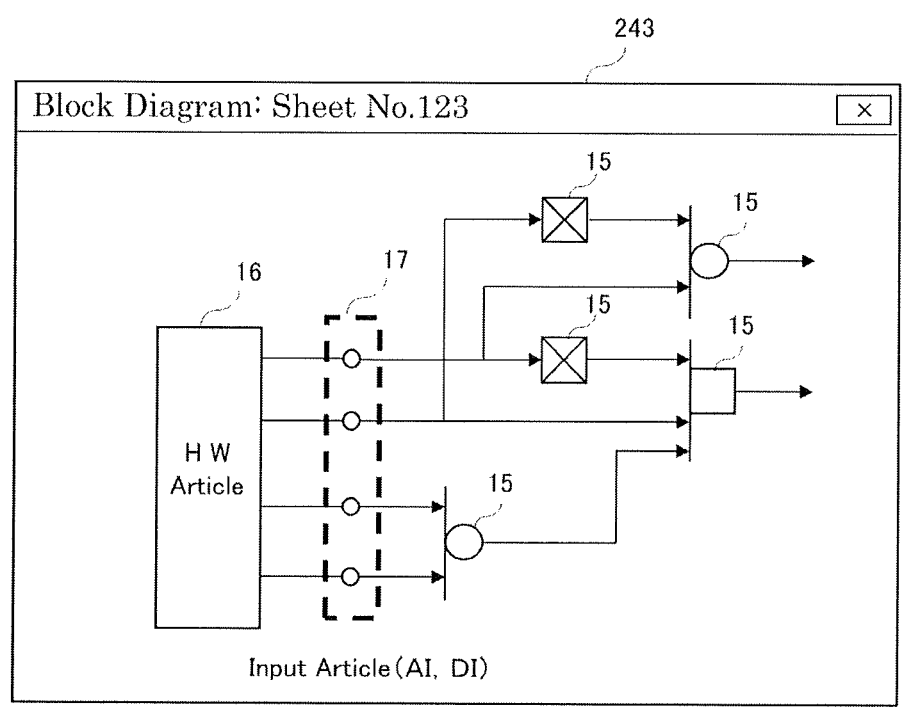
FIG. 6 is a drawing for showing a block diagram in accordance with Embodiment 2.

FIG. 6 shows an example of the block diagram containing a hardware article, which is displayed on the display section 24. Boundary articles between the plant instrument 15 and the hardware article 16 are placed on the screen 243, on which a hardware article 16 is described. Input articles 17, which are shown as four round symbols in the drawing, are boundary articles (AI, DI, and the like) which indicate the input from the hardware article 16. The hardware article 16 is not a control operation logic, which operates in the controlling unit 1. Accordingly, it is preferable to display the hardware article 16 on the display section 24 of the control program creating unit 2, so that the hardware article 16 may be identified as a hardware article, by painting with a color different from that of normal plant instruments. The on-line monitor section 28 of the control program creating unit 2 superimposes the computational decisions of the controlling unit 1 on a block diagram which is displayed on the screen 243 of the display section 24, and displays the decisions together with the control operation logics of the block diagram.

Therefore, as for the control program automatic creation system in accordance with the present Embodiment 2, a control program creating unit excludes a hardware article to create a control program, when the block diagram which is stored in the block diagram data storage section contains a hardware article which is connected to the plant instrument. In the above-mentioned Embodiment 1, only the control operation logic which operates in the controlling unit 1 was described in the block diagram. According to the control program automatic creation system in accordance with the present Embodiment 2, it becomes possible to describe on a block diagram a hardware article which is not allowed to be operated in the controlling unit 1, because the control program creating unit 2 is provided with the hardware article discrimination section 29. For this reason, it becomes possible to more efficiently precede entry tasks of the block diagram, which is a design document of higher rank.

In other words, in the control program automatic creation system in accordance with the present embodiment, a control program creating unit has a hardware article discrimination section which identifies the hardware article indicated by the editorial section at the block diagram. The control program automatic creation system has a feature that a hardware article discrimination section removes hardware article information which is unnecessary to the generation of executable codes from a block diagram, and an executable code generation section generates the executable code which operates in the controlling unit from the block diagram which is described by the editorial section.

Embodiment 3.

Figure 7:
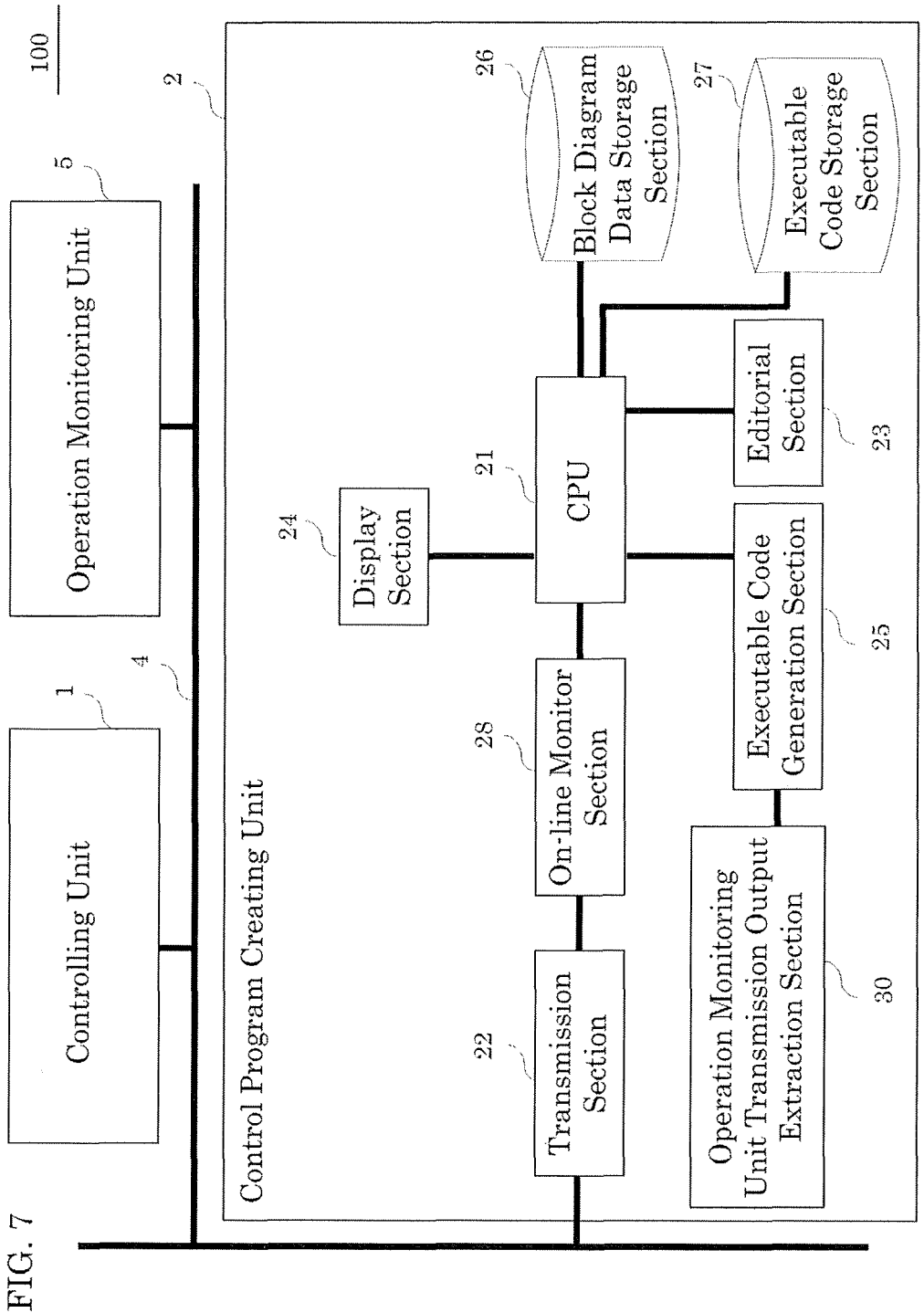
FIG. 7 is a drawing for showing the whole configuration of a control program automatic creation system in accordance with Embodiment 3.

FIG. 7 shows the whole configuration of a control program automatic creation system in accordance with Embodiment 3 of the present invention. The control program automatic creation system 100 in accordance with the present embodiment comprises a controlling unit 1, a control program creating unit 2, a maintenance network 4, and an operation monitoring unit 5. The control program creating unit 2 is provided with an operation monitoring unit transmission output extraction section 30, which is connected to the executable code generation section 25. In the operation monitoring unit 5, a plant operator performs the operation of plant instruments and the monitoring of their operational status. It is to be noted that, the example shown in the drawing illustrates a controlling unit 1, a control program creating unit 2 and an operation monitoring unit 5, which are respectively connected to the maintenance network 4. However, the configuration where multiple units of the controlling unit 1, the control program creating unit 2 and the operation monitoring unit 5 are connected to the maintenance network 4 is allowable.

Figure 8:
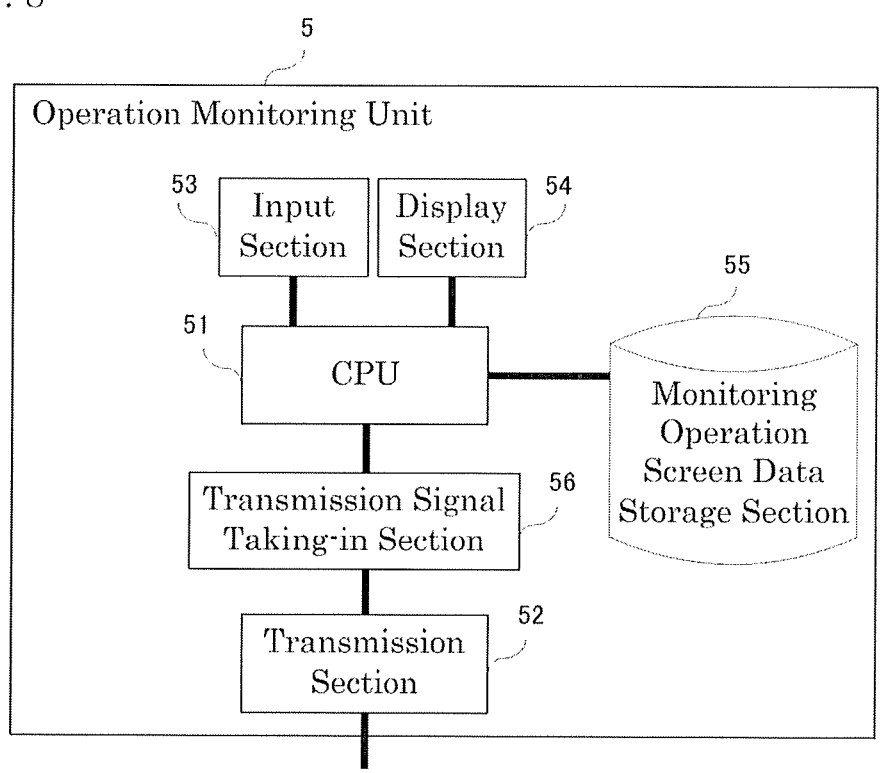
FIG. 8 is a drawing for showing the configuration of an operation monitoring unit in accordance with Embodiment 3.

FIG. 8 shows a configuration of the operation monitoring unit 5. The operation monitoring unit 5 is provided with a CPU (Central Processing Unit) 51, a transmission section 52, an input section 53, a display section 54, a monitoring operation screen data storage section 55, and a transmission signal taking-in section 56. The input section 53 has input devices, like a mouse, a keyboard and others. Monitoring operation screen data is stored in the monitoring operation screen data storage section 55. Command signals and others which are output from the operation monitoring unit 5 are input into the CPU 11 of the controlling unit 1 by way of the maintenance network 4 and the transmission section 12. In the control program creating unit 2, a signal (operation monitoring unit transmission output) which is displayed on the display section 54 of the operation monitoring unit 5 can be described in a block diagram. The signal, which is displayed on the display section 54 like a monitor and others, is superimposed on and described in the block diagram which the display section 24 displays, as an operation monitoring unit transmission output.

Figure 9:
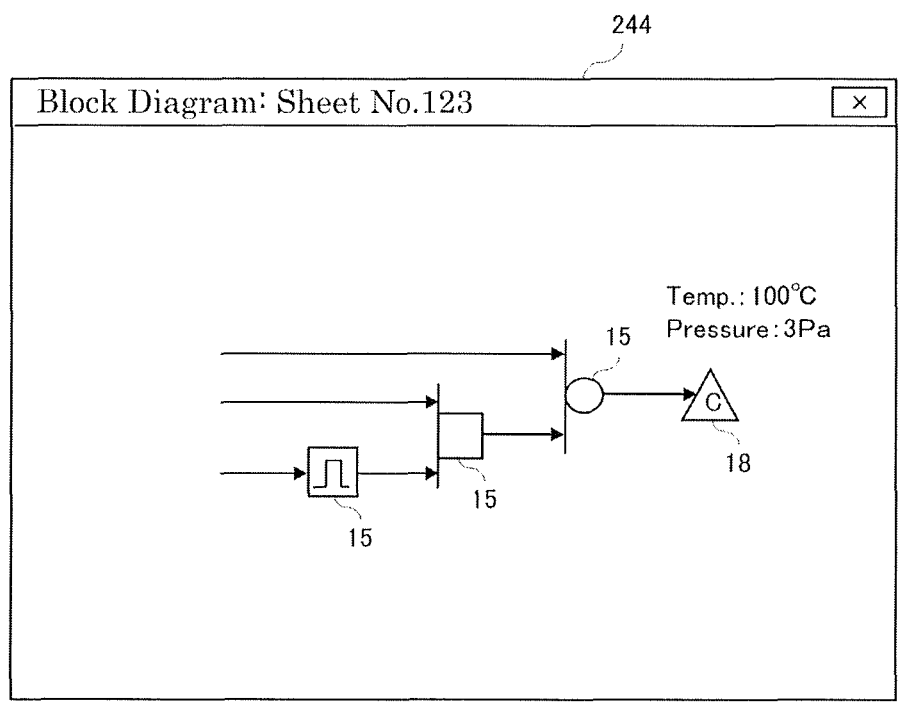
FIG. 9 is a drawing for showing a block diagram in accordance with Embodiment 3.

FIG. 9 shows an example of the block diagram which includes a part transmitting an operation monitoring unit transmission output. In the screen 244 which the display section 24 displays, a part 18 denoted by the symbol ΔC is one of plant instruments, and is sending an operation monitoring unit transmission output to the operation monitoring unit. Temperature and pressure of the part 18, which is a plant instrument, are expressed on the screen 244. The block diagram in accordance with the present embodiment describes a signal which is displayed on the operation monitoring unit 5 as an operation monitoring unit transmission output. The on-line monitor section 28 of the control program creating unit 2 superimposes the computational decisions of the controlling unit 1 on the control operation logic of the block diagram which is displayed on the screen 244 of the display section 24, and displays the superimposed data. Therefore, in the control program automatic creation system in accordance with the present embodiment, when a controlling unit receives a process signal from the plant instrument which is connected to a PIO device, the controlling unit sends the process signal to a network. When the control program creating unit receives a process signal by way of the network, the control program creating unit superimposes the process signal on the block diagram which the display section displays, and displays the superimposed block diagram on the screen.

Next, explanations will be given on the operation of the control program automatic creation system 100. The operation monitoring unit transmission output extraction section 30 of the control program creating unit 2 extracts an operation monitoring unit transmission output from the block diagram data which are stored in the block diagram data storage section 26, and passes it to the executable code generation section 25. The executable code generation section 25 compiles the output and generates the executable code which transmits the relevant signal information (operation monitoring unit transmission output) to the operation monitoring unit 5. The CPU 21 stores the compiled executable code in the executable code storage section 27. Signals (process signals, such as temperature, speed, and pressure, and situation signals, such as operational status), which are described in the block diagram, are displayed on a monitoring operation screen of the display section 54 in the operation monitoring unit 5.

Figure 10:
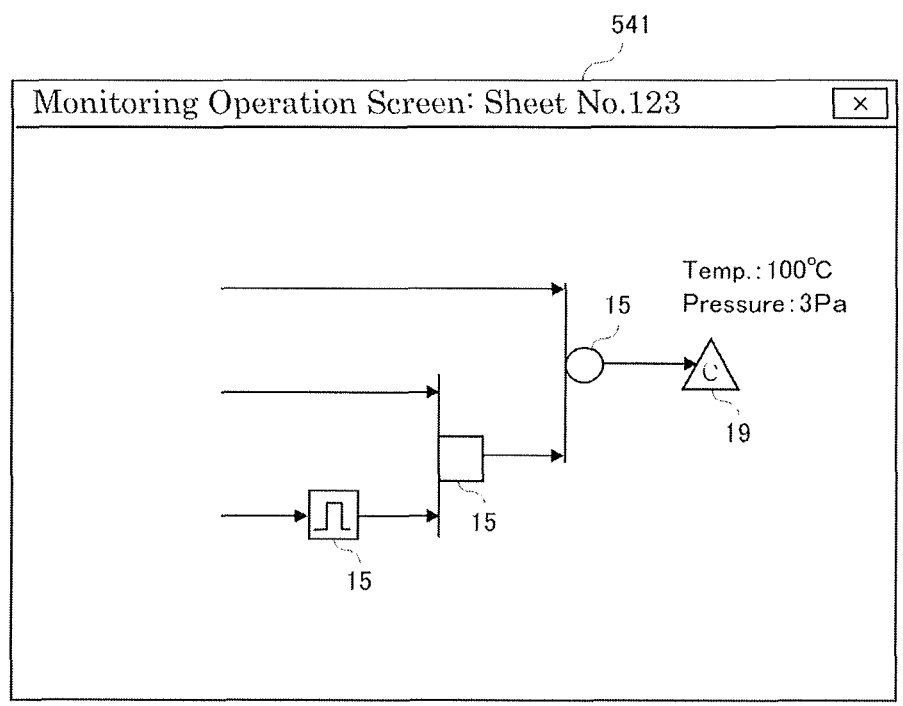
FIG. 10 is a drawing for showing a monitoring operation screen in accordance with Embodiment 3.

Signal information (operation monitoring unit transmission output) which is extracted in the operation monitoring unit transmission output extraction section 30 is transmitted to the operation monitoring unit 5, by way of the transmission section 22 and the maintenance network 4. In the operation monitoring unit 5, the operation monitoring unit transmission output which is received by way of the transmission section 52 is delivered to the transmission signal taking-in section 56. The transmission signal taking-in section 56 takes the relevant signal information (operation monitoring unit transmission output) into the monitoring operation screen data of the operation monitoring unit, which are stored in the monitoring operation screen data storage section 55. FIG. 10 shows an example of the monitoring operation screen which the display section 54 shows. On the screen 541 which is displayed by the display section 54, a part 19 which is one of the plant instruments is receiving an operation monitoring unit transmission output which the part 18 on the screen 244 is sending.

In the operation monitoring unit 5, computational decisions are received from the controlling unit 1 by way of the maintenance network 4 and the transmission section 52, and a monitoring operation screen which displays the operational status, alarm information, and the like of a plant instrument is displayed on the display section 54. Furthermore, the screen switching control of the display section 54, the driving operation instruction of the plant instrument and others are carried out in the input section 53. Transmission signals from the controlling unit 1 to the operation monitoring unit 5 are extracted by the operation monitoring unit transmission output which is described in a block diagram. Operational status, alarm information, and the like on the plant instrument are displayed on the monitoring operation screen. Therefore, in the control program automatic creation system in accordance with the present embodiment, the controlling unit will send a process signal to a network, when the controlling unit receives the process signal from a plant instrument which is connected to a PIO device, and the operation monitoring unit will display the process signal on the monitoring operation screen which the display section displays, when the operation monitoring unit receives the process signal by way of a network.

According to the control program automatic creation system of the present Embodiment 3, linkage between the monitoring operation screen of the operation monitoring unit 5 and the block diagram of the control program creating unit 2 can be attained, through the fact that the control program creating unit 2 is provided with the operation monitoring unit transmission output extraction section 30. As a result, in addition to the same effect as those of the above-mentioned Embodiment 1 and Embodiment 2, the entry task of the monitoring operation screen can be improved in efficiency in the operation monitoring unit 5.

In other words, the control program automatic creation system in accordance with the present embodiment includes a controlling unit, a control program creating unit, and an operation monitoring unit, which are connected each other by a maintenance network or a communication network. The operation monitoring unit performs the controlling operation of a plant instrument, and the monitoring of the operational status. The control program creating unit has an operation monitoring unit transmission output extraction section 30, for identifying the operation monitoring unit transmission output which is described in a block diagram by the editorial section. The control program automatic creation system has a feature that the executable code generation section 25 generates the executable code which transmits the transmission output signal (operation monitoring unit transmission output), extracted from the block diagram, to the operation monitoring unit 5.

Embodiment 4.

Figure 11:
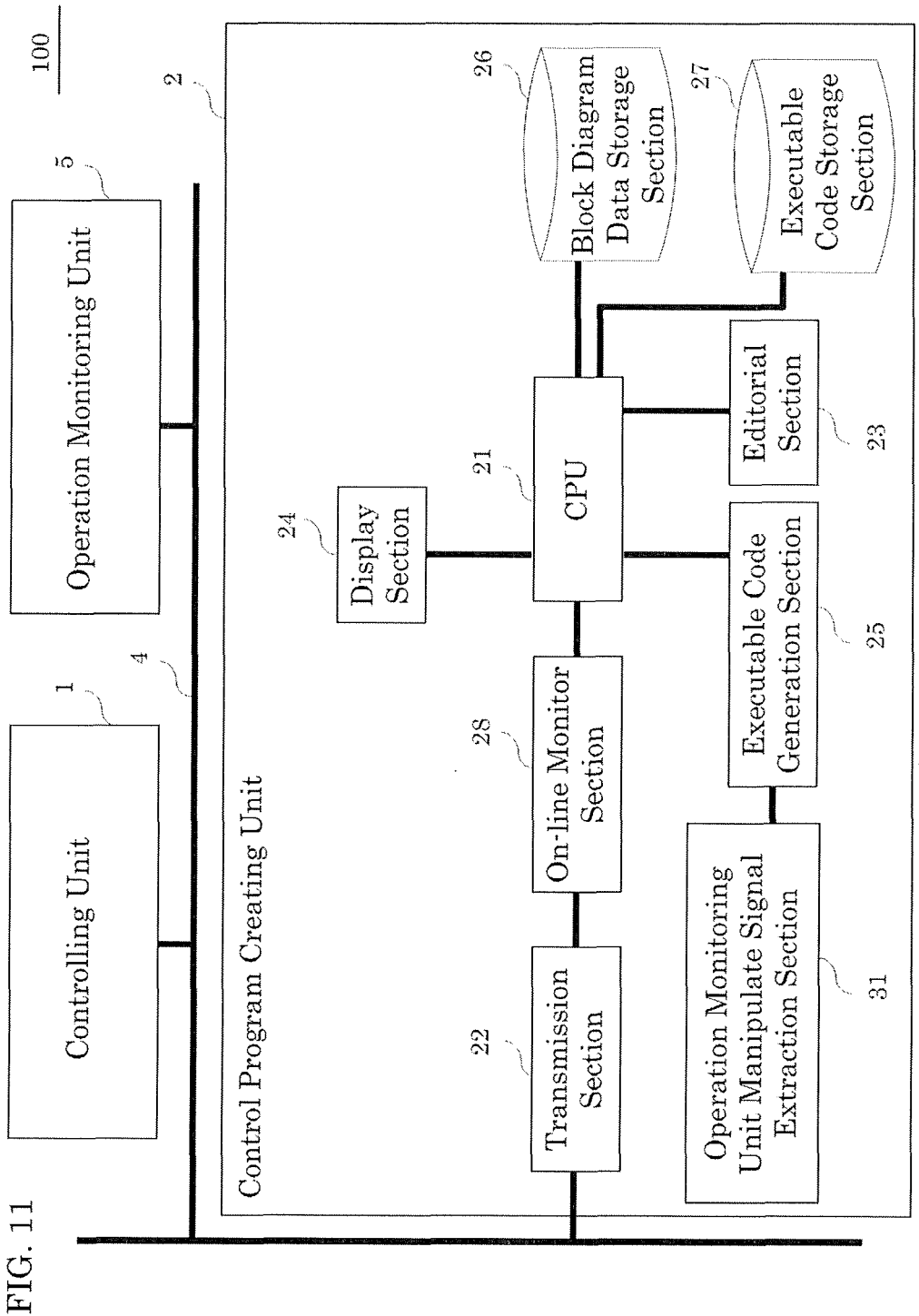
FIG. 11 is a drawing for showing the whole configuration of a control program automatic creation system in accordance with Embodiment 4.

FIG. 11 shows the whole configuration of a control program automatic creation system in accordance with Embodiment 4 of the present invention. The control program automatic creation system 100 in accordance with the present embodiment comprises a controlling unit 1, a control program creating unit 2, a maintenance network 4, and an operation monitoring unit 5. According to the present embodiment, the control program creating unit 2 is provided with an operation monitoring unit manipulate signal extraction section 31 which is connected to the executable code generation section 25. As for the rest configuration of the control program creating unit 2, the present embodiment is the same as that of the above-mentioned Embodiment 3. The operation monitoring unit manipulate signal extraction section 31 extracts, from the block diagram data which are stored in the block diagram data storage section 26, a manipulate signal which will lead a connection with an operation frame, and passes it to the executable code generation section 25. The executable code generation section 25 generates, through compiling, an executable code which will lead the controlling unit 1 to receive the relevant manipulate signal, and stores it in the executable code storage section 27.

Figure 12:
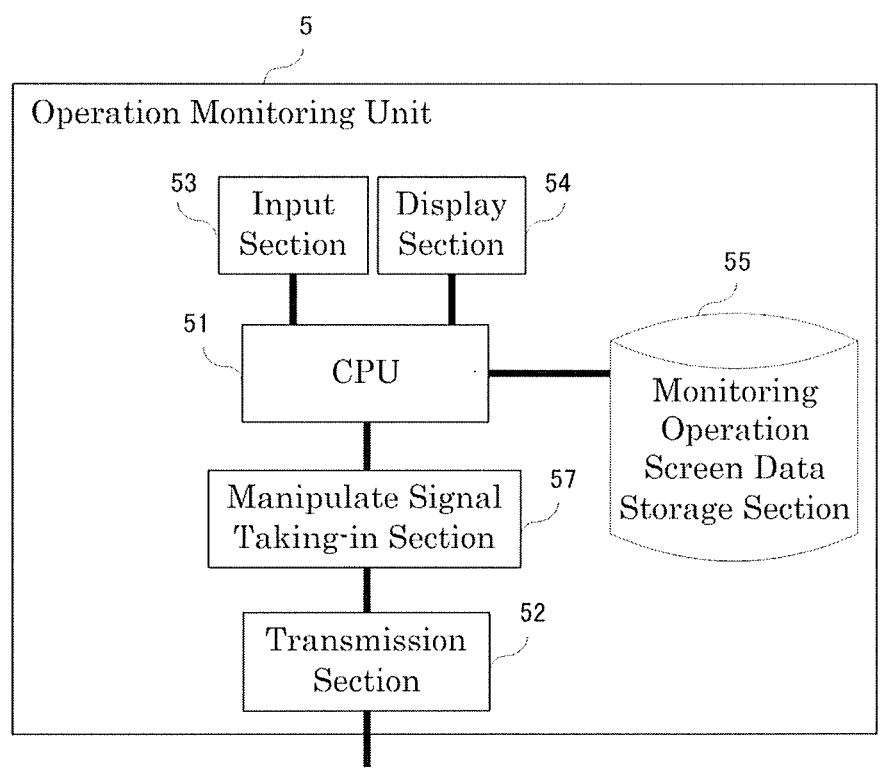
FIG. 12 is a drawing for showing the configuration of an operation monitoring unit in accordance with Embodiment 4.

FIG. 12 shows a configuration of the operation monitoring unit 5 in accordance with the present embodiment. The operation monitoring unit 5 is provided with a manipulate signal taking-in section 57. In the control program creating unit 2, it is possible to describe a signal which will lead the operation of a plant instrument from the operation monitoring unit 5 on a block diagram. The signal which will lead the operation of a plant instrument from the operation monitoring unit 5 will be described, as an operation frame, in a block diagram of the display section 24. Here, the operation frame which is described in the block diagram corresponds to an operation machine, a controller, and the like, which will lead the operation of a plant instrument from the operation monitoring unit 5.

The control program creating unit 2 transmits a manipulate signal, which is extracted by the operation monitoring unit manipulate signal extraction section 31, to the operation monitoring unit 5 by way of the transmission section 22 and the maintenance network 4. In the operation monitoring unit 5, the received manipulate signal information is transferred to the manipulate signal taking-in section 57, and the CPU 51 takes in the relevant manipulate signal information to the monitoring operation screen data of the operation monitoring unit 5, which are stored in the monitoring operation screen data storage section 55. When an operation is carried out from the monitoring operation screen of the operation monitoring unit 5, a manipulate signal which leads the connection to an operation frame will be transmitted to the controlling unit 1.

Figure 13:
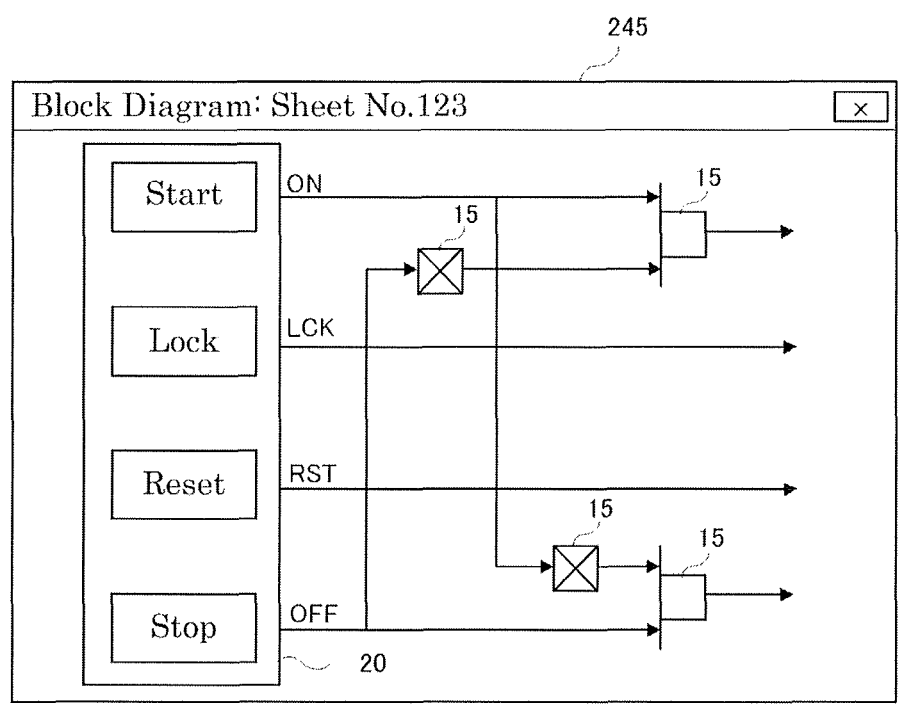
FIG. 13 is a drawing for showing a block diagram in accordance with Embodiment 4.

FIG. 13 shows an example of the block diagram which contains an operation frame. In the screen 245, an operation frame 20 includes buttons of start, lock, reset, and stop. Plant instruments 15 correspond to a pump, a fan, a valve, and the like. When an operator performs, from the monitoring operation screen of the operation monitoring unit 5, the operation of an operation machine which corresponds to an operation frame 20 described in the block diagram, a manipulate signal of the operation frame will be transmitted to the controlling unit 1. Therefore, when an operation frame which is displayed on the monitoring operation screen receives a manipulate signal, the operation monitoring unit will send the manipulate signal to the network. In the operation monitoring unit 5, through an input section 53, a driving operation instruction to the plant instrument is performed from the display section 54.

Figure 14:
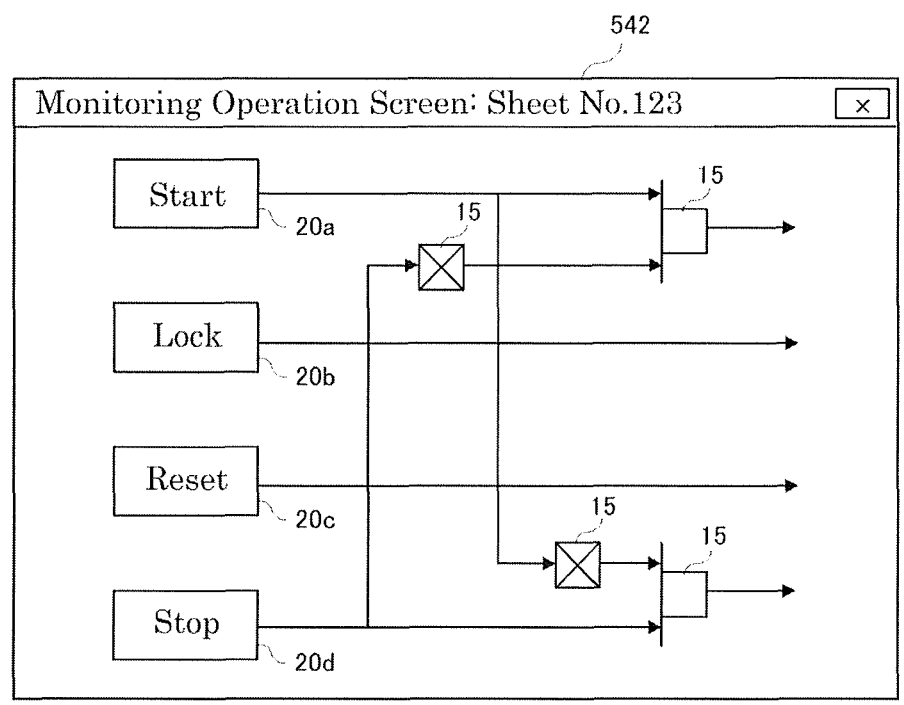
FIG. 14 is a drawing for showing a monitoring operation screen in accordance with Embodiment 4.

FIG. 14 shows an example of the monitoring operation screen which the display section 54 shows. In the screen 542 which is displayed by the display section 54, parts 20a-20d are receiving an operation monitoring unit transmission output which the operation frame 20 of the screen 245 is sending. The manipulate signals which are transmitted from the parts 20a-20d are delivered to the control operation logics of the block diagram, and the controlling unit 1 carries out operational processing. A manipulate signal, which passes from the operation monitoring unit 5 to the controlling unit 1, is extracted from the operation frame which is described in the block diagram. The manipulate signal from the monitoring operation screen will be transmitted to the controlling unit 1. Therefore, the controlling unit will lead the operation of a plant instrument which corresponds to the operation frame, when the controlling unit receives the manipulate signal by way of a network.

According to the present Embodiment 4, in addition to the same effect as those of the above-mentioned Embodiment 1 to Embodiment 3, linkage between the operation from the operation monitoring unit 5 and the block diagram of the control program creating unit can be attained, owing to the fact that the control program creating unit is provided with the operation monitoring unit manipulate signal extraction section 31. As a result, entry task in the monitoring operation screen can be improved in efficiency. Therefore, according to the control program automatic creation system in accordance with the present embodiment, an operation frame will be displayed on the monitoring operation screen of the operation monitoring unit, when an operation frame, which will lead the operation of a plant instrument, is input into the block diagram which is displayed by the control program creating unit. Furthermore, when an operator operates a plant instrument which is currently displayed on the monitoring operation screen, the plant instrument which is under the management of the controlling unit will work.

More specifically, in the control program automatic creation system 100 in accordance with the present embodiment, the control program creating unit 2 has an operation monitoring unit manipulate signal extraction section, which is capable of extracting a manipulate signal intended to the controlling unit, from the operation frame which is described by the editorial section in the block diagram. The executable code generation section has a feature in that it generates the executable code with which the operation monitoring unit receives a manipulate signal which is extracted from the block diagram. Furthermore, the operation monitoring unit will send the manipulate signal to a network, when the operation frame displayed on the monitoring operation screen receives a manipulate signal. The controlling unit will lead the operation of the plant instrument corresponding to the operation frame, when the controlling unit receives the manipulate signal by way of the network.

Embodiment 5.

Figure 15:
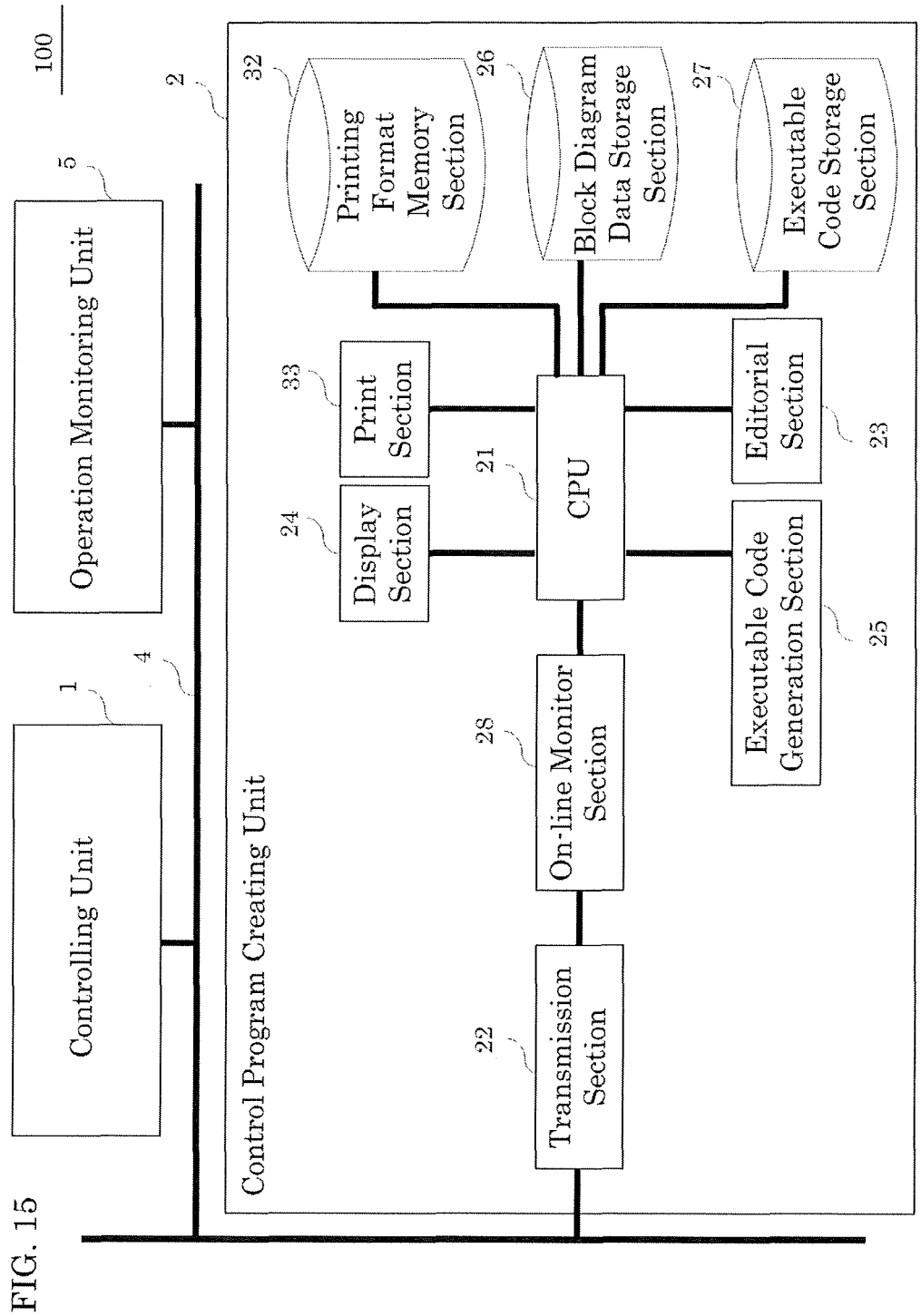
FIG. 15 is a drawing for showing the whole configuration of a control program automatic creation system in accordance with Embodiment 5.

FIG. 15 shows the whole configuration of a control program automatic creation system in accordance with Embodiment 5 of the present invention. The control program automatic creation system 100 in accordance with the present embodiment comprises a controlling unit 1, a control program creating unit 2, a maintenance network 4, and an operation monitoring unit 5. According to the present embodiment, the control program creating unit 2 is provided with a printing format memory section 32 and a print section 33. The CPU 21 takes command of the printing format memory section 32 and the print section 33. As for the rest of the configuration, the present embodiment is the same as the above-mentioned Embodiment 1 to Embodiment 4 in the configuration, and then, explanation of the configuration is omitted.

Figure 16:
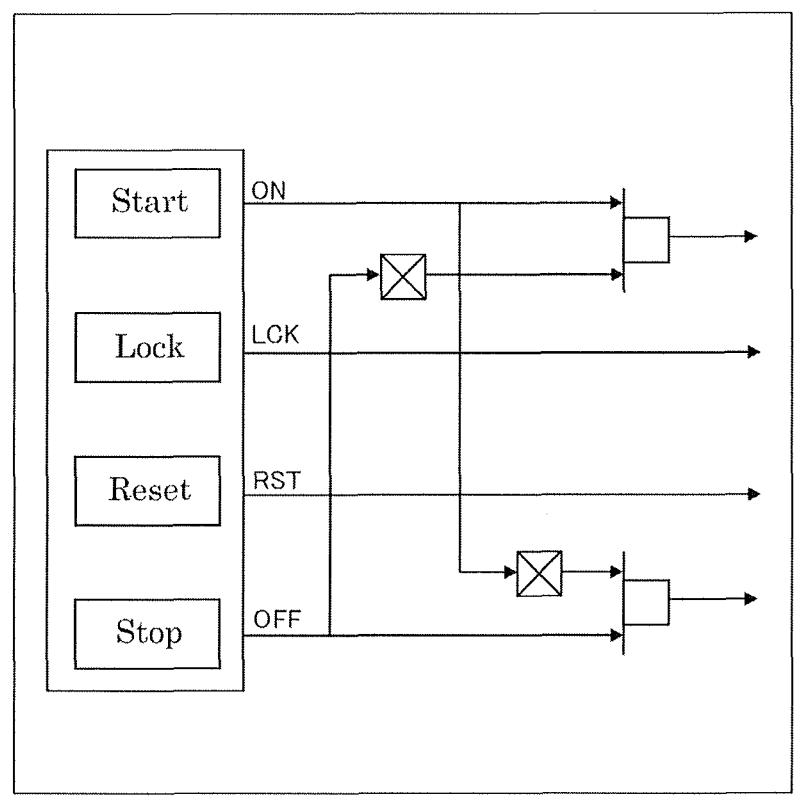
FIG. 16 is a drawing for showing a printed document in accordance with Embodiment 5.

The print section 33 makes it possible to print the block diagram data which are stored in the block diagram data storage section 26 in compliance with the printing format which is stored in the printing format memory section 32. Furthermore, the print section 33 generates a cover and a table of the contents automatically, and in addition, also generates and prints a signal enumerated list of all the block diagram data, and makes it possible to submit the block diagram as a design document of higher rank to customers. FIG. 16 shows an example of a block diagram, where the diagram is printed in a format which is in compliance with the printing format.

According to the present Embodiment 5, owing to the fact that the control program creating unit is provided with the printing format memory section 32 and the print section 33, in addition to the same effect as those of the above-mentioned Embodiment 1 through Embodiment 4, it becomes possible to print a block diagram as a deliverable document for customers. As a result, on-line monitoring at the controlling unit 1 and the control program creating unit 2 can be performed on the same screen as the drawings of a block diagram which are delivered to the customer, and then, the better maintenance of the plant instrument is performed.

In other words, according to the control program automatic creation system in accordance with the present embodiment, the control program creating unit has a printing format memory section and a print section. A feature is that printing a block diagram is performed in a format which is in compliance with the printing format which is stored in the printing format memory section. Furthermore, the control program creating unit prints the block diagram in a format, which is in compliance with the prescribed format.

It is to be noted that each embodiment of the present invention may be freely combined, or appropriately modified or omitted within the spirit and scope of the invention.

EXPLANATION OF NUMERALS AND SYMBOLS

1 Controlling Unit; 2 Control program Creating Unit; 4 Maintenance Network; 5 Operation Monitoring Unit; 12 Transmission Section; 13 Memory; 14 Process Signal Input-output Device; 15 Plant Instrument; 20 Operation Frame; 22 Transmission Section; 23 Editorial Section; 24 Display Section; 25 Executable Code Generation Section; 26 Block Diagram Data Storage Section; 27 Executable Code Storage Section; 28 On-line Monitor Section; 29 Hardware Article Discrimination Section; 30 Operation Monitoring Unit Transmission Output Extraction Section; 31 Operation Monitoring Unit Manipulate Signal Extraction Section; 32 Printing Format Memory Section; 33 Print Section; 52 Transmission Section; 53 Input Section; 54 Display Section; 55 Monitoring Operation Screen Data Storage Section; 56 Transmission Signal Taking-in Section; 57 Manipulate Signal Taking-in Section; 100 Control Program Automatic Creation System; 241 Screen; 242 Screen; 243 Screen; 244 Screen; 245 Screen; 541 Screen; 542 Screen

What is claimed is:

1. A control program automatic creation system, comprising
    a control program creator, having a block diagram data storage, an executable code storage, and a display; wherein the control program creator stores a block diagram which shows an arrangement of a plant instrument in the block diagram data storage, creates a control program of the plant instrument based on the block diagram which is stored in the block diagram data storage, and further stores the created control program in the executable code storage,
    a controller, having a process input output (PIO) device and a memory, the controller receiving a process signal from the plant instrument which is to be connected with the PIO device, and
    a network, connecting the control program creator and the controller,
    wherein
    the control program creator transmits the control program which is stored in the executable code storage by way of the network, and
    when the controller receives the control program by way of the network, the controller stores the control program in the memory, and further executes the control program, and transmits a computational decision of the control program by way of the network, and
    when the control program creator receives the computational decision of the control program by way of the network from the controller, the control program creator superimposes the computational decision on the block diagram which the display section displays and displays the superimposed decision.

2. The control program automatic creation system, as set forth in claim 1,
    wherein
    when the controller discovers an abnormal situation to the plant instrument which is connected to the PIO device, the controller transmits alarm information to the network, and
    when the control program creator receives the alarm information by way of the network, the control program creator superimposes the received alarm information on the block diagram which the display displays and displays the superimposed information.

3. The control program automatic creation system as set forth in claim 1,
    wherein
    when the block diagram which is stored in the block diagram data storage contains a hardware article which is connected to the plant instrument, the control program creator creates a control program in which the hardware article is excluded.

4. The control program automatic creation system as set forth in claim 1,
    further comprising an operation monitor which has an display for displaying a monitoring operation screen of the plant instrument, and
    wherein the operation monitor is connected to the network.

5. The control program automatic creation system as set forth in claim 4,
    wherein
    when the controller receives the process signal from the plant instrument which is connected to the PIO device, the controller transmits a process signal to the network, and
    when the control program creator receives the process signal by way of the network, the control program creator superimposes the process signal on the block diagram which the display displays and displays the superimposed signal.

6. The control program automatic creation system as set forth in claim 4,
    wherein
    when the controller receives a process signal from the plant instrument which is connected to the PIO device, the controller transmits the process signal to the network, and
    when the operation monitor receives the process signal by way of the network, the operation monitor displays the process signal on the monitoring operation screen which the display displays.

7. The control program automatic creation system as set forth in claim 4,
    wherein
    when an operation frame which leads an operation of the plant instrument is input into a block diagram which the control program creator displays, the operation frame is displayed on the monitoring operation screen of the operation monitor.

8. The control program automatic creation system as set forth in claim 7,
    wherein
    when the operation frame which is displayed on the monitoring operation screen receives a manipulate signal, the operation monitor transmits the manipulate signal to the network, and
    when the controller receives the manipulate signal by way of the network, the controller operates the plant instrument which corresponds to the manipulate signal.

9. The control program automatic creation system as set forth in claim 4,
    wherein the control program creator prints the block diagram in a format which is in compliance with a prescribed format.

* * * * *